United States Patent [19]

Takada

[11] 3,996,967
[45] Dec. 14, 1976

[54] REINFORCED LINING FOR TUBES
[75] Inventor: Takezo Takada, Hikone, Japan
[73] Assignee: Takata Kojyo Co., Ltd., Tokyo, Japan
[22] Filed: Feb. 18, 1975
[21] Appl. No.: 550,807

Related U.S. Application Data

[63] Continuation of Ser. No. 400,442, Sept. 24, 1973, abandoned.

[30] Foreign Application Priority Data

Oct. 18, 1972 Japan .......................... 47-103544

[52] U.S. Cl. .................. 138/97; 156/94; 156/287; 427/238
[51] Int. Cl.[2] .................. F16L 55/18; B32B 35/00
[58] Field of Search .......... 138/93, 97, 98; 156/94, 156/287; 117/2 R, 95

[56] References Cited
UNITED STATES PATENTS

| 2,564,602 | 8/1951 | Hurst | 138/125 |
| 2,690,769 | 10/1954 | Brown | 138/125 |
| 3,123,101 | 3/1964 | Blount et al. | 138/97 |
| 3,261,374 | 7/1966 | Anderson et al. | 138/97 |
| 3,602,263 | 8/1971 | Bremmer | 138/97 |

Primary Examiner—Steven L. Stephan
Attorney, Agent, or Firm—Wolder & Gross

[57] ABSTRACT

A method for repairing ruptured or otherwise damaged or weakened large diameter pipes such as underground water or sewer pipes, includes opening the opposite ends of the pipe to provide access, cleaning debris from within the pipe and smoothing its inside surface. A peripherally expandable fibrous web reinforced synthetic organic resinous tube which is either thermoplastic or thermosetting and in an uncured state is inserted in the pipe and clamp to the ends thereof by end plates and expanded into tight engagement with the pipe wall by circulating hot pressurized air through the tube. The interface of the pipe and tube may be provided with a heat sensitive adhesive and where the tube resin is thermosetting, the hot air is maintained until curing or setting is effected. Thereafter the repaired pipe is flange reconnected to the opposite end pipes.

6 Claims, 3 Drawing Figures

REINFORCED LINING FOR TUBES

This is a continuation of application Ser. No. 400,442, filed Sept. 24, 1973 and now abandoned.

BACKGROUND OF THE INVENTION

The present invention relates generally to improvements in the repair of pipes, conduits and the like, and it relates particularly to an improved method for repairing large diameter pipes or conduits with difficult access, such as underground sewer pipes or mains for water, gas and utilities.

Large diameter long pipes are widely employed in the transportation of fluids, both liquid and gaseous, such as sewer pipes, water mains, gas mains, and many other functionary pipes and conduits. Such pipes and conduits are usually accessible along their full lengths only with great difficulty, being either underground or in remote areas. Moreover, these pipes require frequent repair, since they are often ruptured, weakened and otherwise damaged. This damage is commonly a consequence of such occurrences and conditions as abrupt or radical changes in the differential pressure internally and externally of the pipe, ambient foundation or earth movements resulting from many causes, corrosion and erosion, and many other causes. In order to properly maintain the service afforded by underground pipe, any serious leaks must be promptly detected and repaired, and such repair generally requires the replacement of a long length of large diameter pipe, since the repair of a section of the pipe by welding, patching or otherwise, is usually unsatisfactory and very difficult. However, particularly in the case of underground pipe, the replacement of the pipe is difficult, expensive and highly time consuming and hence greatly inefficient, since structurally the pipe is still sound overall and except for weak areas and the points of rupture, still possess a long life expectancy. Not only is it necessary to dig a trench along and beyond the full length of the pipe section to permit its replacement, but the transport of the large pipe to and from the site is difficult, expensive and time consuming, as is the handling and manipulation of the pipe which necessitates the use of heavy crane equipment. Accordingly, the common practice in the maintenance and servicing of underground pipes and mains is expensive, time consuming and difficult and otherwise leaves much to be desired.

SUMMARY OF THE INVENTION

It is a principal object of the present invention to provide an improved process for repairing damaged or defective pipes, conduits and other tubular devices.

Another object of the present invention is to provide an improved method and apparatus for repairing leaks in large diameter fluid carrying pipes, conduits and mains.

Still another object of the present invention is to provide an improved method and apparatus for repairing leaks in underground or otherwise difficult accessible pipes, conduits and mains.

A further object of the present invention is to provide a method of the above nature characterized by its simplicity, ease of application, reliability, low time consumption, obviation of the need for skilled labor and great versatility and adaptability.

The above and other objects of the present invention will become apparent from a reading of the following description taken in conjunction with the accompanying drawing.

In a sense the present invention contemplates the provision of an improved method for repairing a leaking pipe which includes the step of disposing in and along a section of the pipe having the leak a tube of a synthetic organic polymeric resin composition, introducing gas under pressure into the tube while in a soft state to expand the tube into tight engagement with the inside face of the pipe, and then effecting the hardening of the repair tube while in its fully expanded state. The resin composition may be thermoplastic, for example, a thermoplastic polyvinyl chloride or polyolefin or the like, or may be an uncured soft thermosetting resin containing a heating activating curing agent or a curing agent and a heat deactivating curing retarding agent. Examples of suitable thermosetting compositions are described in co-pending U.S. patent application Ser. No. 181,146 filed Sept. 16, 1971. In this case a thermoplastic resin repair tube is employed, after it is heated and expanded it is advantageously permitted to cool before the pressure therein is relieved and where a thermosetting resin tube is employed, the pressure and heat are maintained until the tube has set. The outside face of the tube or the inside face of the pipe may have an adhesive applied thereto, preferably a temperature sensitive adhesive to assure a suitable bonding of the pipe and tube at their interface. The repair tube is advantageously reinforced with fibers of a natural or synthetic nature, for example, polyester, polyamide, glass fibers or the like. Advantageously the fibers extend peripherally and longitudinally with the peripheral fibers having a high non-recoverable elongation whereas the longitudinal fibers are of low elongation. Preferably the repair tube has imbedded therein for reinforcing a woven web in which the warp extends longitudinally and is of low elongation, and the filler extends peripherally and is of high elongation, for example, unstretched or low stretched polyester or polyamide filaments or yarns.

The improved method is employed to great advantage in the repair of ruptured underground pipes, such as mains. Man or access holes, when not present, are dug at opposite ends of the ruptured pipe sections after the pipe has been suitably emptied and the section is uncoupled from adjacent sections to provide access to its interior. The collapse repair tube is inserted into the cleaned pipe and clamped by end plates to the pipe end flanges and hot pressurized fluids, for instance, air, is then circulated through the tube until it expands, and if formed of a thermosetting resin composition, until it is cured or set. The end plates are then removed and the repaired pipe section is recoupled to the adjacent pipe sections. In the case of sewerage pipes, man holes are generally present at opposite ends of successive pipe sections so that any digging or coupling and uncoupling operations are not necessary. Moreover, the present lining method may be applied to undamaged pipe before the installation or laying thereof. The procedure is simple, reliable and rapid and requires little skilled labor.

DESCRIPTION OF THE PREFERRED EMBODIMENT

Figure 1:
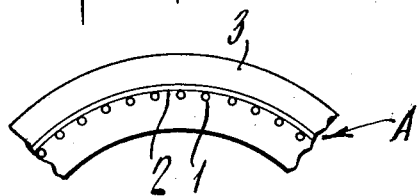
FIG. 1 is a fragmentary transverse sectional view of a repair tube employed in the present improved process.
Figure 2:
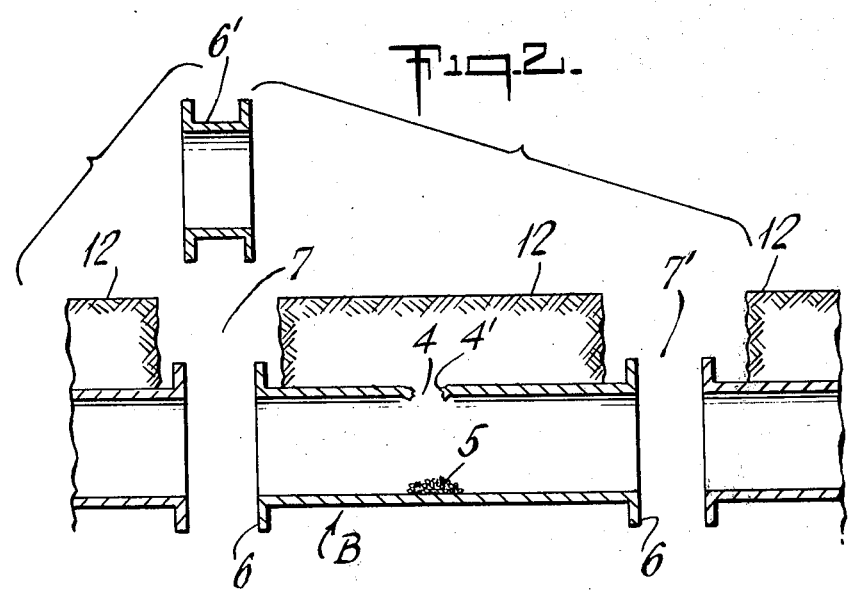
FIG. 2 is a longitudinal sectional view of a ruptured underground main preparatory to its repair.
Figure 3:
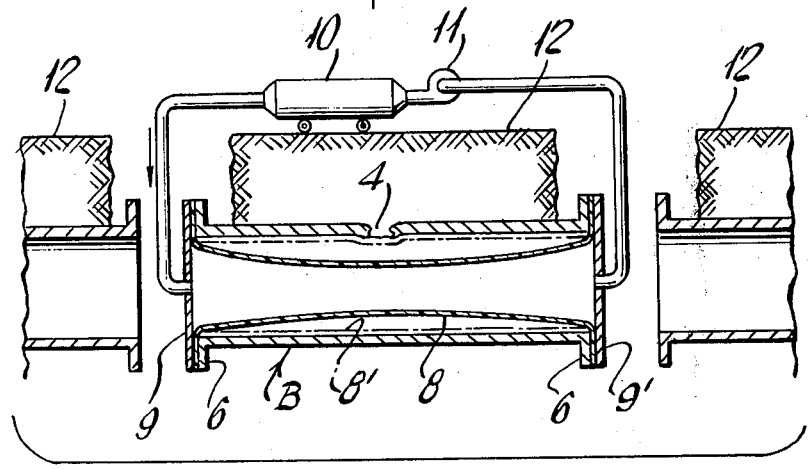
FIG. 3 is a view similar to FIG. 2 illustrating a step in the repair procedure and the improved equipment employed therein.

Referring now to the drawing which illustrates a preferred embodiment of the present invention as applied to the repair of underground pipes or mains, the reference letter A generally designates the liner or repair tube and the reference letter B designates a damaged underground main covered by overlying material 12 in the conventional manner, the material 12 being paved or unpaved, depending on its location. The pipe B in its unprepaired state, is shown as having a rupture or leak opening 4 with ragged inwardly depressed borders 4', the debris 5 from the rupture 4 being accumulated on the bottom of pipe B underlying the rupture 4.

The repair or line tube A includes a body or matrix 3 formed of a thermoplastic resin or of a soft thermosetting resin composition of the nature set forth above and having a latent curing or cross linking agent. An example of a suitable resin composition in a latent thermosettable state is as follows:

| Ingredient | Parts by Weight |
| --- | --- |
| Polyvinyl chlorideresin | 100 |
| Arylester Thermosetting plasticizer (Tetraethylene glycol dimethacrylate | 40 |
| Diiso octyl phthalate | 20 |
| Stabilizer (Cd . Ba stearate) | 3 |
| Thermosetting initiator (Di-t-butyl perbenzoate) | 2 |

The resin in its normal uncured state at room temperature is highly flexible and has a hardness of approximately 85 (Shore D) at 20°. The thickness of tube A is advantageously between 2 and 100 mm.

The matrix 3 has imbedded therein and bonded thereto a cylindrical reinforcing web including longitudinally extending fibers 1 and peripheral fibers 2 having the compositions earlier set forth. The fibers or yarns 1 and 2 are advantageously interwoven and define a fabric warp and filling respectively. The warp 1 is of low elongation for example, stretch oriented polyester or polyamide or glass fibers or the like, and the filling 2 is of high elongation, such as unstretched polyester or polyamide fibers. For example, fiber or warp 1 be of an elongation of 10 percent and fiber or filling 2 an elongation of 100 percent with a maximum elongation at break of at least 600 percent with a non-recoverable elongation of at least 25 percent.

In repairing the damaged pipe section B with coupling flanges 6 are provided at opposite ends thereof, the immediate pipe system, if a pressurized gas or water main, is first emptied of the gas or water, access to the ends of pipe section B is obtained through preformed manholes or by digging man holes or trenches 7 and 7' at opposite ends of pipe section B and uncoupling and removing the short connector pipe section 6' connecting the pipe section B to opposite pipe sections. The holes 7 may be manually dug or may be dug by conventional power equipment. Upon obtaining access to the opposite ends of the pipe section B the debris 5 is removed and the inside face of pipe section B is cleaned.

The equipment employed in applying the tube A to the cleaned ruptured pipe B includes a pair of centrally apertured end plates 9 and 9' of approximately the diameter of the pipe end flanges 6, suitable means being provided for releasably hermetically clamping the end plates 9 and 9' to respective flanges 6, for example, the end plates and flanges may be provided with correspondingly spaced apertures for accommodating bolts to effect their tight interconnection. A portable air heating unit 10 of conventional construction has an outlet connected by a flexible hose to the aperture in end plate 9 and an inlet connected to the outlet of a motor driven air circulating blower 10 whose inlet is connected by a flexible hose to the aperture in the other end plate 9'. Conventional means are provided for regulating the temperature of the circulating air produced by the heating unit 10 by controlling the unit 10 in the known manner and means may be provided for introducing additional air into the circulating system to increase the pressure therein in the event that the heat expansion thereof is insufficient to fully expand the tube A and the pressure may be otherwise regulated.

In applying the tube A, whose outside diameter is considerably less than the inside diameter of tube B to the inside face of pipe B, a section 8 of tube A is inserted along the length of pipe B and its opposite ends are expanded and the end borders turned outwardly to form end flanges which are sandwiched and clamped between end plates 9 and 9' and respective pipe flanges 6 and the end plates are clamped to the flanges 6. The heating unit 10 and the blower 11 are then energized to heat and circulate air through tube section 8 to expand the circulating air which may be further pressurized by pumping additional air therein, the heated circulating air at increased pressure expanding the tube section 8' and non-recoverably elongating the peripheral fibers 3 so that the expanded tube section 8 firmly hugs and adheres to the inside face of pipe B, sealing the rupture 4 as well as the entire inside face of the pipe B. The heated air circulation is continued until the resin forming the tube has cured or theremoset, for example with the specific resin specified above, the air is circulated at a temperature of about 40° to 200° C for a period of 10 to 500 minutes, the fibers 2 having been stretch oriented and retaining its stretched condition by reason of the stretching thereof.

After the setting or cross linking of the resin, as above, the heating unit 10 and blower 11 are deenergized, the pressure in the system is relieved, the expanded tube cooled, and the end plates unclamped from flanges 6 and raised through holes 7. The pipe section B is then recoupled by means of flanged coupling sections 6' to adjacent pipe sections and, if desired, the holes 7 are refilled to complete the operation.

It should be noted that in the above operation the expanded tube 8' will usually bond to the inside face pipe section B, although this is not necessary, particularly where the hardness of the expanded treated tube 8', whether the resin is thermoplastic or thermosetting, is at least self supporting in the absence of internal pressure. However, in many cases it is desirable that the tube and pipe be adherent to each other, and where bonding is not normally effected by the above procedure, a layer of adhesive or cement, advantageously of a heat sensitive or activated nature is applied to the outside face of tube 8 or the inside face of pipe section B so that they are firmly bonded or secured at their interface.

While there have been described and illustrated preferred embodiments of the present invention, it is apparent that numerous alterations, omissions and additions may be made without departing from the spirit thereof.

I claim:

1. The method of lining a pipe with a heat rigidifiable and settable thermosetting, synthetic organic polymeric resin composition tube reinforced peripherally with peripherally extending synthetic polymeric fibers of high non-recoverable elongation and longitudinally with fibers of low elongation in an unexpanded state comprising inserting in said pipe a tube with the property characteristics set forth above having an outside diameter less than the inside diameter of said pipe, radially expanding and peripherally extending said tube while in a soft flexible condition into tight engagement with the inside face of said pipe by inflating and filling said tube with pressurized and heated fluid, said peripheral extension of said tube being of an amount sufficient to non-recoverably elongate said peripheral fibers, and heating said inflated and expanded tube to effect the thermosetting and hardening of said tube to a rigid state in adherence to said pipe and relieving said fluid pressure and cooling said tube while in engagement with said pipe.

2. The method of claim 1 wherein said pressurized fluid is heated and circulated through said tube to effect said heating of said resin composition until said resin composition is substantially set.

3. The method of claim 1 wherein said fibers are defined by the filler of a woven web imbedded in said tube.

4. The method of claim 1 comprising applying end plates to the ends of said pipe and clamping the end borders of said tube between said end plates and corresponding ends of said tube and circulating, said pressurized and heated fluid through said tube by way of openings in said end plates to effect said expansion and heating of said tube.

5. The method of claim 1 comprising applying an adhesive to at least one of the confronting peripheral faces of said pipe and said tube prior to the expansion of said tube.

6. The method of claim 1 wherein said pipe includes a first underground section and coupled at opposite ends to adjacent second pipe sections and including the steps of digging holes at the opposite ends of said first pipe section and uncoupling said first section from said second section to provide access to said first section, said tube being inserted into said first section prior to the expansion of said tube.

* * * * *